Feb. 2, 1937. P. A. FISKER 2,069,703
FILTER FOR VACUUM CLEANERS AND THE LIKE
Filed Feb. 8, 1935

P. A. Fisker
INVENTOR

By Glascock Downing & Seebold
ATKS.

Patented Feb. 2, 1937

2,069,703

UNITED STATES PATENT OFFICE 2,069,703

FILTER FOR VACUUM CLEANERS AND THE LIKE

Peder Andersen Fisker, Copenhagen, Denmark, assignor to Aktieselskabet Fisker & Nielsen, Copenhagen, Denmark Application February 8, 1935, Serial No. 5,675
In Denmark April 9, 1934

3 Claims. (Cl. 183—51)

Filters for vacuum-cleaners and the like have the deficiency, when they consist of a single layer of fabric, that very fine dust can penetrate through the fabric. This is particularly the case in vacuum-cleaners having a great sucking force. The dust retained by the filter settles on that side of the filter facing the dust-filled air, but the finest dust particles can enter somewhat into the fabric of the filter. Indeed, this fine dust will not pass through the filter at once, but during the use of the filter it will, however, be successively sucked deeper and deeper into the filter fabric until at last it penetrates fully through the fabric.

The same deficiency is found in filters of the known kind consisting of two or more layers of fabric sewn together, because the very fine dust will first pass one filter layer and settle thereafter in the space before the second filter layer, through which it is later on sucked as stated above. Thus a filter consisting of, for instance, two layers sewn together will collect between the filter layers fine dust which cannot be removed and will penetrate through the whole filter sooner or later.

Beside the said filters consisting of several layers sewn together it is known to use several filters placed freely within each other, which brings the advantage that each filter may be cleaned separately. Such filters have, however, the deficiency that the assembled filter does not form a unity, so that it may be risked that one or more of the filters may be lost, and possibly the employer will use only one filter layer during the dust-sucking in order to avoid cleaning a plurality of filters.

The invention has for its purpose to do away with the said deficiency of the filters for vacuum-cleaners and the like of the kind in which the filter bag or corresponding filter body consists wholly or partly of two or more layers, and the invention is chiefly characterized in that the filter is constructed in such a way that two or more of the filter bags or the like are interconnected or held together in such a way, for instance at the centre of their bottoms, that by turning one or more of the filtering layers inside out two or more of them may be separated from each other so as to make those faces of the said layers facing each other in their operative positions accessible for cleaning without suspending the connection between the filter layers.

This makes it possible to remove in a particularly easy and convenient way the fine dust settled between the filter layers, e. g. by brushing or sucking those faces of the filter layers facing each other in their operative positions, because during this cleaning the filter will appear as a continuous whole which is easy to manipulate and may, for instance, be held in one hand, so that the other hand is free to execute the cleaning. Besides, the filter according to the invention ensures that both or all of the filter layers are employed during the dust-sucking, so that nothing of the fine dust can penetrate through the filter and be sucked into the engine so as to injure bearings etc. Such security is not obtained when the individual filter layers are not interconnected.

The accompanying drawing illustrates different constructional forms of the invention and indicates how a filter bag or the like consisting of several filter layers may be made accessible for cleaning the interior contiguous faces of the individual layers without complete detachment of the layers from one another.

Figure 1:
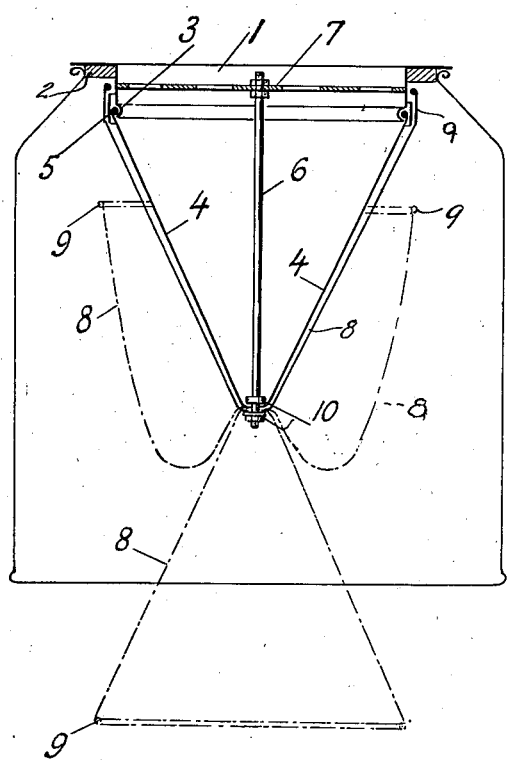
Fig. 1 is a diagrammatical section of a filter for a vacuum-cleaner. This filter has two layers of filter fabric and is of that kind where the proper filter bag is kept in an invariable shape by an inner rigid stiffener.

In all of the figures 1 is a metal ring carrying the filter bag. The said metal ring has an outwardly directed flange against the lower side of which an annular rubber packing 2 bears. When the filter is placed in the dust container of the vacuum-cleaner, the edge of the opening of the container is pressed air-tight against the packing 2. At its lower edge the metal ring 1 has a groove 3 in which the edge of one of the filter layers, viz. the layer 4, of the filter bag is kept. Normally this keeping of the filter bag 4 to the metal ring 1 is further secured by an outward clamping ring 5, which is shown only in Fig. 1 for the sake of simplicity.

As stated above, the filter represented in Fig. 1 has an invariable shape owing to an inner rigid stiffener, which may consist, as indicated in Fig. 1, of a vertical rod 6 rigidly connected with the metal ring 1 for instance by a perforated plate 7. The lower end of the rod 6 carries a pair of clamping discs 10 or the like, between which the edge of the bottom aperture of the filter bag 4 is fastened. Fig. 1 illustrates that the filter bag 4 is surrounded by another correspondingly shaped filter bag 8. The edge of the bottom opening of the filter bag 8 is also fastened between the clamping discs 10 or the like. At its top the filter bag 8 has an annular supporting means which consists in the illustrated embodiment of a metal ring 9 secured to the filtering fabric. It appears from Fig. 1 that the two filter layers 4 and 8 bear against each other and that the outer bag 8 is kept on its place by the metal ring 9 which is pushed up around the vertical depending wall of the metal ring 1. In order to remove the fine dust which has penetrated through the filtering layer 8 and gathered between the filtering layers 4 and 8 the filter 8 is pulled down as indicated in broken lines in Fig. 1, and finally it is fully turned inside out as indicated in broken lines at the bottom of Fig. 1. Hereupon the outer face of the filter 4 and the prior inner face of the filter 8 may be cleaned by brushing or vacuum-cleaning. After the cleaning the filter 8 is again applied as indicated in full lines in Fig. 1.

Figure 2:
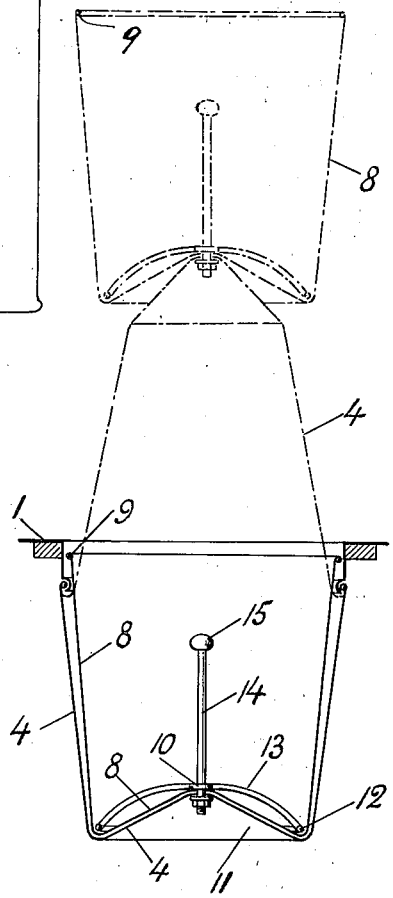
Fig. 2 is a diagrammatical section of the invention as employed in a vacuum-cleaner having a filter which consists of two layers and may be turned inside out.
Figure 3:
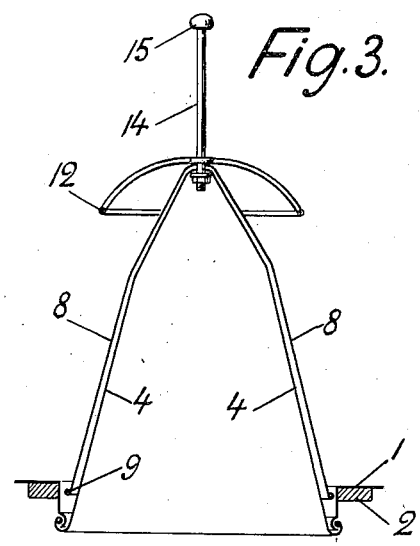
Fig. 3 shows the same filter as Fig. 2 turned inside out.

The filter represented in Figs. 2 and 3 is of that kind which may be turned fully out of the dust container and turned inside out, when the dust gathering on the outer face of the filter 4 (Fig. 3) during the suction has to be shaken off and caused to fall down into the dust container. The filter 4, 8 in Fig. 2 is in Fig. 3 shown turned inside out. As appears from Fig. 2, the filter bag consisting of the filtering layers 4 and 8 is carried by the metal ring 1 and clamping ring 9 in quite a similar manner as specified in connection with Fig. 1 with the only difference that the layer 8 is placed inside the filter 4. The filter shown in Figs. 2 and 3 and capable of being turned inside out is of that particular kind where the filter bag 4, 8 has an upwardly directed filter cone 11, Fig. 2, extending about midway up into the interior of the filter bag. In its working position the filter bag is kept extended and stretched by a support, which may consist for instance of a perforated cup-shaped plate or of a metal wire ring 12 carried by stiffeners 13 extending from the upper clamping disc 10 or the like retaining the apex of the filter cone 11. The clamping discs 10 or the like are screwed on to an upwardly directed rod 14 terminating at its top in a button 15 of an insulating material which, when the vacuum-cleaner is assembled, bears against the bottom of the motor and fan casing. In Fig. 2 it is indicated in broken lines how the filter 4, 8 is to be served when the two contiguous faces of the two filter layers 4 and 8 have to be cleaned. To this end the clamping ring 9 of the filter layer 8 is first drawn up from the metal ring 1, whereupon the whole filter is lifted by taking hold of the clamping ring 9. The filter layer 4 thus will form an upwardly directed almost conical body as indicated in broken lines in Fig. 2. The filter layer 8 will not change its shape owing to the lifting, because it encloses and carries still the interior stiffener, as indicated in broken lines in Fig. 2. It appears from Fig. 2 that the contiguous faces of the two filter layers will be removed from each other after their being lifted, so that the desired cleaning may be carried out by brushing or vacuum-cleaning.

The invention is not limited to the constructional forms shown in the drawing merely by way of examples. For instance the filter 4 can be supported by other means than the rigid metal ring 1, while the filter 8 is placed on a clamping ring 9. The clamping ring 9 may be replaced by a metal ring of a similar kind as the metal ring 1 and provided with a rubber packing, so that when the vacuum-cleaner is assembled tightness is obtained between the two filters 4 and 8 by the said rubber packing.

The filter layers are so tightened in their working positions that the air is forced during the suction to wholly or substantially pass through all of the filtering layers. Owing hereto care must be taken at the performance of the invention in practice that such a tightening is produced between the individual filter layers, as for instance 8 and 4, that the air passing the outer filter layer is wholly or substantially forced to pass also through the filtering layer or layers inside the first layer.

I claim:

1. In a structure of the character described, a dust container having an opening, a stiffening ring detachably secured in air-tight condition to said container adjacent said opening, a plurality of filter bags arranged within said container and having closed bottoms secured to one another, one of said bags being connected at its open end to said stiffening ring, a clamping ring secured to the open end of said second bag and frictionally engaging the inner surface of said stiffening ring for normally maintaining said second bag in position within said container, said clamping ring being adapted to be drawn up from said stiffening ring, whereby said last-mentioned bag may be raised bodily for turning said first bag inside out, and means extending into said second bag and connected to the closed bottoms of said bags for simultaneously turning both of said bags inside out.

2. A device as claimed in claim 1, in which the means for simultaneously turning both of the bags inside out includes a supporting member, arms extending laterally from the lower end of said supporting member and adapted to engage the inner wall of said second bag for maintaining the bottoms of said bags in extended condition.

3. A device as claimed in claim 1, in which the means for simultaneously turning both of the bags inside out includes a supporting member, a perforated inverted cup-shaped member secured to the lower end of said supporting member, the outer edge of said cup-shaped member being adapted to engage the inner wall of said second bag for maintaining the bottoms of said bags in extended condition.

PEDER ANDERSEN FISKER.